US005575953A

United States Patent [19]

Tachizono et al.

[11] Patent Number: 5,575,953

[45] Date of Patent: Nov. 19, 1996

[54] COATING COMPOSITIONS FOR THE INNER WALL OF CATHODE-RAY TUBE

[75] Inventors: Shinichi Tachizono, Chiba; Hironobu Chiyoda, Kokubunji, both of Japan

[73] Assignee: Hitachi Powdered Metals Co., Ltd., Chiba, Japan

[21] Appl. No.: 416,313

[22] Filed: Apr. 4, 1995

[30] Foreign Application Priority Data

Apr. 6, 1994 [JP] Japan .................................... 6-093079

[51] Int. Cl.$^6$ .............................. H01B 1/18; H01J 31/00; C01B 33/32

[52] U.S. Cl. .......................... 252/504; 252/502; 252/506; 252/507; 252/510; 106/626; 427/64

[58] Field of Search .................................... 252/502, 504, 252/506, 507, 510; 427/64, 68, 106, 397.8; 106/626; 220/2.1 A

[56] References Cited

U.S. PATENT DOCUMENTS

| | | | |
|---|---|---|---|
| 3,791,546 | 2/1974 | Maley et al. | 220/2.1 A |
| 4,041,347 | 8/1977 | Deal et al. | 427/64 X |
| 4,052,641 | 10/1977 | Dominick et al. | 106/84 X |
| 4,379,762 | 4/1983 | Chiyoda et al. | 427/64 X |
| 4,425,377 | 1/1984 | Deal et al. | 427/64 |
| 5,147,460 | 9/1992 | Otaki | 106/626 X |

FOREIGN PATENT DOCUMENTS

| | | |
|---|---|---|
| 5252362 | 9/1975 | Japan . |
| 51-067992 | 6/1976 | Japan . |
| 552042 | 1/1980 | Japan . |
| 3141539 | 6/1991 | Japan . |
| 359542 | 9/1991 | Japan . |
| 6240182 | 8/1994 | Japan . |

*Primary Examiner*—Douglas J. McGinty
*Attorney, Agent, or Firm*—Birch, Stewart, Kolasch & Birch, LLP

[57] ABSTRACT

In a coating composition for the inner wall of a cathode-ray tube comprising an aqueous dispersion medium containing potassium silicate, a dispersing agent and graphite particles or a combination of graphite particles and metal oxide particles or metal carbide particles suspended therein, the invention is characterized in that the molar ratio of silicon dioxide to potassium oxide ($SiO_2/K_2O$) in said potassium silicate is in the range of from 4 to 5, and the obtained coating film is characterized in that the adsorption quantity of moisture and gases is small and adhesiveness is excellent.

8 Claims, 1 Drawing Sheet

COATING COMPOSITIONS FOR THE INNER WALL OF CATHODE-RAY TUBE

BACKGROUND OF THE INVENTION

1. Field of the Invention

This invention relates to a coating composition for coating the inner wall of a Braun tube (cathode-ray tube). More particularly, the invention relates to a coating composition containing electroconductive graphite which is used for coating the inner wall surface of the funnel glass of a cathode-ray tube.

2. Description of Prior Art

The inner wall surface of a funnel glass of a cathode-ray tube is provided with an electroconductive coating. This electroconductive coating film plays an important part in functions to accelerate electron beams by applying a high voltage and to capture secondary electrons which are emitted from a shadow mask, magnetic shielding materials and a fluorescent screen.

The electroconductive coating of this kind is formed by spraying or brushing a coating composition to the inner wall surface of a funnel, which composition contains fine particles of electroconductive substance. This coating procedure is followed by a drying step and a baking step in the air.

The cathode-ray tube is produced by a process such that a funnel section the inside of which is provided with an electroconductive coating composition and a separately made fluorescent screen section are bonded together with a low-melting glass at about 440° C. to prepare a tubular body. An electron gun is then built into the tubular body and the inside of the tube is evacuated by heating and exhausting. Because the coating film formed on the inner wall of the funnel before the evacuation adsorbs moisture, carbon dioxide and other gases from the surrounding air, the adsorbed gases must be removed by heating treatment and exhausting under a reduced pressure just before the process of sealing up of the cathode-ray tube.

Even when the above evacuation is successfully carried out, trace quantities of adsorbed gases remain in the cathode-ray tube and, during the operation of the cathode-ray tube, the adsorbed gases are slowly released. The released gases react with the cathode and the function of the cathode is deteriorated, and ultimately, the emission of electrons is damaged. For this reason, it is eagerly demanded that the quantities of gases released after the sealing of the cathode-ray tube are reduced so as to prolong the service life of the cathode-ray tube.

In the above-mentioned process for producing cathode-ray tubes, if the electroconductive coating peels off from the inner wall of the funnel, arc discharge and electrical leakage are caused to occur during the working of the cathode-ray tube. Arc discharge and electrical leakage impair the high voltage stability of the tube, so that the electroconductive coating must be tightly bonded to the inner wall of funnel so as to prevent the coating from peeling off even when it is subjected to vibration or other shocks. In addition, it is necessary to regulate the electrical resistance of the coating film into a certain range in order to reduce the spark currents.

For the above reason, it is necessary that the coating composition of this kind can be applied without difficulty and it is formed into a smooth and uniform coating film without causing any cracking or wrinkling. Furthermore, it is required to minimize the dripping of the coating composition. Still further, the degassing of formed graphite layer must be effective and, after the degassing, the graphite layer should not release any gas in the condition of vacuum.

The coating composition according to the present invention is made by dispersing fine particles of graphite as an electroconductive substance in an aqueous medium which contains a dispersing agent and potassium silicate as an adhesive. If necessary, in order to regulate the electrical resistance of the coating film, fine particles of metal oxides or metal carbides such as iron oxide, titanium oxide and silicon carbide, can be additionally dispersed.

It is possible to use only graphite particles as an electroconductive material; However because the spark current is relatively large in this case, fine particles of graphite and metal oxide are commonly used together. That is, the graphite gives electroconductivity to lower the electrical resistance of a coating film, while, the metal oxide functions as a filler and at the same time, it functions to raise the electrical resistance of coating films, like the silicates adhesives. Therefore, the electrical resistance and adhesive strength of a coating film can be adjusted to certain values by changing the compounding ratios of these materials.

Exemplified as the metal oxides are the oxides of Fe, Ti, Co, Ni, Cr, Mn, Al and Si, as disclosed in, for example, Japanese Patent Publication No. Sho 55-2042, Japanese Patent Publication No. Hei 3-59542 and Japanese Patent Publication No. Sho 63-45428. Coating compositions containing oxides of iron or titanium are commercially available. It is known as disclosed in the above-mentioned Japanese Patent Publication No. Sho 63-45428 that, in order to disperse stably both negatively charged particles and positively charged particles in a negatively charged dispersion medium, negatively charged graphite particles and positively charged $TiO_2$ particles are agglomerated together and negatively charged $SiO_2$ particles are stuck around the agglomerated particles to obtain compound particles to be dispersed. It is also known as disclosed in Japanese Patent Publication No. Sho 61-20990 that silicon carbide particles in addition to graphite particles are added in order to prevent a coating film from peeling by improving its adhesive property.

The particle diameters of the above-mentioned metallic compounds including metal oxides and metal carbides are in the range of about 0.1 to 1 μm. As iron oxide, $\alpha$-$Fe_2O_3$ is used and as titanium oxide, rutile type one is used.

The graphite as an electroconductive material has a particle size distribution in the range of about 0.5 to 10 μm. In practice, both natural graphite and artificial graphite can be used.

As disclosed in Japanese Laid-Open Patent Publication No. Sho 52-52362 and Japanese Patent Publication No. Sho 63-45428, adhesives are exemplified by lithium silicate, potassium silicate and sodium silicate. Among them, potassium silicate is widely used in industrial practice. This is due to the fact that the coating films using lithium silicate are liable to be peeled off from the glass surface of cathode-ray tube although its moisture adsorbing property is low and, in the case of sodium silicate, moisture adsorption is intense and the formed coating is soft.

The molar ratio of silicon dioxide and potassium oxide ($SiO_2/K_2O$) in the potassium silicate was about 2.8 to 3.8 in the conventional art as disclosed in e.g., Japanese Patent Publication No. Sho 55-2042.

As the above-mentioned dispersing agent, carboxymethyl cellulose or the like is used.

The compositions of the coating materials are disclosed in the above-mentioned patent gazettes. The compounding ratio of graphite particles to potassium silicate is generally determined in accordance with a desired value in electrical resistance. This can be varied diversely according to the configuration and specification of the cathode-ray tubes to be produced. When the quantity of graphite is increased, the electrical resistance of a coating film is naturally lowered and the adhesive strength of coating film to the inner wall of a funnel is lowered. On the other hand, when the quantity of potassium silicate is increased, the electrical resistance is increased and the adhesive strength is also improved; however, the undesirable phenomena of blistering and gas generation are caused to occur in the coating film.

In the case of a coating composition in which the dispersion particles are only graphite, it is advisable to use about ⅔ of graphite and the remainder ⅓ of potassium silicate.

In the case of an inner coating composition having the so-called soft-flash effect, the quantities of graphite, metal oxide and potassium silicate are about ⅓, respectively.

The quantity of dispersing agent is about 0.1 to 3% by weight. The dispersing agent has the effect to prevent the graphite particles and metal oxide particles from precipitation to maintain them in a stable suspended state, however, the peeling of coating film is liable to occur when the dispersing agent is added to excess.

The quantity of water in the coating composition is not constant because it is varied according to the manner of applying (spray-coating, brush-coating, etc.), the desired thickness of coating film and required workability. It is generally determined in the range of about 60 to 80% by weight.

BRIEF SUMMARY OF THE INVENTION

Concerning cathode-ray tubes in which coating films are formed using conventional coating compositions, various investigations have been carried out in view of the methods of application of coating compositions and drying and degassing of coated films. As a result, the prior art coating composition has good characteristics in practical uses in its own way.

However, it is further desired to reduce the time length of heating and degassing treatment to release the moisture and carbon dioxide which are adsorbed from the air after the baking of funnel, and to improve the productivity of cathode-ray tubes.

In view of this object, it is proposed in Japanese Laid-Open Patent Publication No. Hei 3-141539 that cement which hardly adsorbs moisture and gas is used as an adhesive, and in Japanese Laid-Open Patent Publication No. Sho 63-114025 that metal hydride which functions to adsorb and release gases is added. However, the effects of these proposals are not yet satisfactory.

In view of the above-mentioned circumstances in the conventional art, the object of the present invention is to provide an electroconductive coating film which adsorbs little moisture and gases in the air and which is excellent in adhesive property.

In accordance with the present invention, the coating composition for applying to the inner wall of a cathode-ray tube is of the type which comprises an aqueous dispersion medium containing potassium silicate, a dispersing agent and fine particles of single graphite or a combination of graphite particles and metal oxide particles or metal carbide particles suspended therein. The improvement in the present invention is characterized in that, in the above-defined coating composition, the molar ratio of silicon dioxide to potassium oxide ($SiO_2/K_2O$) in said dispersion medium is in the range of from 4 to 5. It is to be noted that the molar ratio of the dispersion medium or potassium silicate, as represented by the ratio of silicon dioxide to potassium oxide ($SiO_2/K_2O$), will be hereinafter referred sometimes to as simply "molar ratio".

BRIEF DESCRIPTION OF DRAWINGS

The above and further objects and novel features and advantages of the present invention will become more apparent from the following description taken in connection with the accompanying drawings in which.

DETAILED DESCRIPTION OF THE INVENTION

Figure 1:
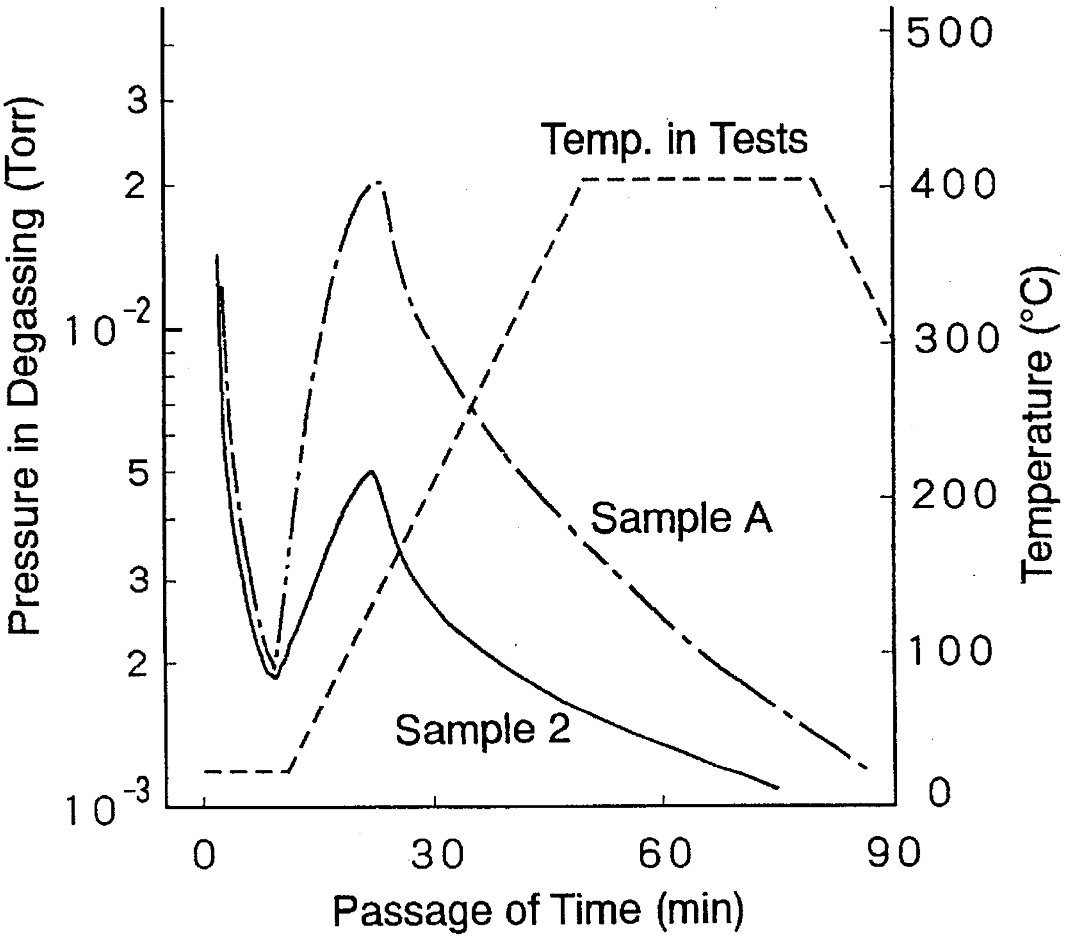
FIG. 1 is a graphic chart showing the changes in temperatures and pressures in the degassing process of coating films in evacuation process at elevated temperatures, which coating films were formed with the coating compositions for the inner walls of cathode-ray tubes.

In the following, several features in the present invention with regard to the coating composition are described in more detail.

Any one of the following methods can be used for the purpose of preparing the potassium silicate used in the present invention, which silicate has the above-defined molar ratio of 4 to 5.

(1) Potassium silicate itself having a molar ratio of ($SiO_2/K_2O$) in the range of from 4 to 5, is used.

(2) Conventional potassium silicate having a molar ratio of less than 4 and other potassium silicate having a higher molar ratio is mixed to dissolve together.

(3) Water soluble silica (fine particles of silicic anhydride) is added to conventional potassium silicate having a molar ratio of less than 4 and they are dissolved together.

(4) An aqueous solution of water soluble silica and potassium hydroxide is added to conventional potassium silicate to dissolve together.

The potassium silicate solution used herein is exemplified by OHKA SEAL (trademark, made by Tokyo Ohka Kogyo Co., Ltd.) and POTASSIUM SILICATE A and POTASSIUM SILICATE B (trademark, made by Nippon Chemical Industries Co., Ltd.)

The water soluble silica is exemplified by SNOWTEX (trademark, made by Nissan Chemical Industries, Ltd.), SILICADOL (trademark, made by Nippon Chemical Industries Co., Ltd.), CATALOID S (trademark, made by Catalysts and Chemical Ind. Co., Ltd.), and LUDOX (trademark, made by E. I. du Pont de Nemours & Co.)

Potassium hydroxide of reagent grade is generally used. Especially, those of highly pure chemical reagent and medical reagent classes are preferable.

The graphite particles, metallic compound particles, potassium silicate and dispersing agent to be used in the present invention are similar to those used in the preparation of coating compositions of this kind in the prior art. That is, the ranges of quantities of solid components in the coating composition using only graphite as an electroconductive material without metallic compound are as follows:

graphite particles: 50–80 wt. % potassium silicate: 20–50 wt. % dispersing agent: 1–3 wt. %

More particularly, the following composition of about ⅔ of graphite and about ⅓ of potassium silicate is preferable:

graphite particles: 60–70 wt. % potassium silicate: 30–40 wt. % dispersing agent: ca. 2 wt. %

The ranges of quantities of solid components in the soft-flash type coating composition to impart the soft-flash effect to the coating film on the inner wall of a cathode-ray tube are as follows:

graphite particles: 15–50 wt. % potassium silicate: 20–50 wt. % metallic compound selected from the group of iron oxide, titanium oxide and silicon carbide 10–50 wt. % dispersing agent: 1–3 wt. %

More preferably:

graphite particles: 30–40 wt. % potassium silicate: 30–40 wt. % metallic compound 20–35 wt. % dispersing agent: ca 2 wt. % in which about ⅓ of the respective materials are used.

When the potassium silicate of 4 to 5 in the above-defined molar ratio is used as a component of a coating composition, the quantity of adsorption of gases in the air can be reduced to a large extent as compared with the case in which potassium silicate of the conventional value of about 3 in molar ratio is used.

For example, the following experiment was carried out. Three kinds of aqueous solutions of potassium silicate of 3.8, 4.1 and 4.5 in molar ratio were prepared and they were dried and baked for 1 hour at 440° C. They were then left to stand in the room air which was adjusted to 25° C. and 50% in humidity. The losses in weight were measured with regard to these samples by a differential thermometer, upon heating again up to 300° C. at a rate of 10° C./min. As a result, about 5% of weight loss, as compared with the weight before the measurement, was observed in the sample of potassium silicate of 3.8 in molar ratio, while the weights of potassium silicate of 4.1 and 4.5 in molar ratios were not changed before and after the measurement. These results indicate that the potassium silicate sample of 3.8 in molar ratio adsorbed about 5 wt. % of water and gases, meanwhile the potassium silicate samples having molar ratios of higher than 4 did not adsorb any water or gases.

In a report of Journal of Japan Adhesive Association, vol. 12, [10], p. 17 (1976) concerning the adhesiveness of potassium silicate coating to plate glass, it is reported that the higher is the molar ratio, the lower the adhesive strength. However, according to the above test results, such a tendency was not observed and it was understood that the potassium silicate having a molar ratio in the range of 4 to 5 could answer the requirement in the adhesive strength in practical uses.

Meanwhile, when the molar ratio of potassium silicate exceeds the value of 5, the property as water-glass decreases because the tendency of gelation develops and therefore, the adhesive strength is lowered.

In other words, as compared with the use of potassium silicate of about 2.8 to 3.8 in molar ratio in the conventional art, the adhesive agent of potassium silicate having a specific molar ratio can be used in the present invention so as to reduce the gas adsorption of the coating film on the inner wall of cathode-ray tubes and, therefore, it has made possible reductions in the time periods and treating temperatures necessary for the heating and evacuating process in the production of cathode-ray tubes. Alternatively, if the same evacuating process parameters as those in the prior art are employed, it is possible to evacuate to a higher vacuum level and to prolong the service life of cathode-ray tubes.

The present invention will be described in more detail with reference to examples.

EXAMPLE 1

Preparation of Potassium Silicate Adhesive

A 1 liter beaker equipped with a heater and a stirrer was fed with 500 g of an aqueous solution of potassium silicate (solid content: 30.0%) of 3.5 in the above-defined molar ratio. While stirring the contents at 120 r.p.m. and at a temperature of 40° C., 145 g of colloidal silica (solid content: 20.5%) was slowly poured into the beaker. After the feeding of the whole colloidal silica, the stirring was continued for a further 60 minutes to obtain an aqueous potassium silicate solution (solid content: 27.9%) of 4.5 in the molar ratio.

Furthermore, using the same method and starting materials, 87 g of colloidal silica was added to 500 g of the aqueous solution of potassium silicate of 3.5 in molar ratio to prepare an aqueous potassium silicate solution (solid content: 28.6%) of 4.1 in molar ratio and with 250 g of colloidal silica to obtain an aqueous potassium silicate solution (solid content: 26.8%) of 5.3 in molar ratio.

Preparation of Coating Compositions

As shown in the following Table 1, 7 kinds of coating compositions were prepared with using 4 kinds of potassium silicate aqueous solutions of molar ratios of 3.5, 4.1, 4.5 and 5.3. Samples 1 to 5 were examples of the present invention and Samples A and B were comparative examples.

Coating compositions were prepared by adding graphite of 2 μm in average particle diameter, a metallic compound of 0.5 μm in average particle diameter, potassium silicate and carboxymethyl cellulose (hereinafter referred to as "CMC") to pure water and they were sufficiently mixed by stirring, which was followed by treatment with ball mill to obtain the respective coating compositions.

TABLE 1

| | Coating Composition (g) | | | | | | |
|---|---|---|---|---|---|---|---|
| Sample No. | 1 | 2 | 3 | 4 | 5 | A | B |
| Graphite | 195 | 195 | 105 | 105 | 105 | 195 | 195 |
| Potassium Silicate Molar Ratio ($SiO_2/K_2O$) 3.5 | — | — | — | — | — | 330 | — |
| Potassium Silicate Molar Ratio ($SiO_2/K_2O$) 4.1 | 346 | — | — | — | — | — | — |
| Potassium Silicate Molar Ratio ($SiO_2/K_2O$) 4.5 | — | 323 | 323 | 323 | 323 | — | — |
| Potassium Silicate Molar Ratio ($SiO_2/K_2O$) 5.3 | — | — | — | — | — | — | 369 |
| Metallic Compound $Fe_2O_3$ | — | — | 99 | — | — | — | — |
| Metallic Compound $TiO_2$ | — | — | — | 99 | — | — | — |
| Metallic Compound SiC | — | — | — | — | 99 | — | — |
| Dispersing | 6 | 6 | 6 | 6 | 6 | 6 | 6 |

TABLE 1-continued

| | Coating Composition (g) | | | | | | |
|---|---|---|---|---|---|---|---|
| Sample No. | 1 | 2 | 3 | 4 | 5 | A | B |
| Agent CMC | | | | | | | |
| Pure Water | 453 | 476 | 467 | 467 | 467 | 468 | 429 |

Preparation of Test Pieces and Their Evaluation

The coating compositions prepared in the above process were applied to glass plates and coating films were dried and baked at 440° C. for 1 hour to obtain test pieces. The evaluation of them were carried out in the following manner.

(1) Specific Resistance

A method with is effective in evaluating test pieces having a low electrical resistance called generally as four-probe method was employed. Used test apparatus was LORESTA 401 (trademark, made by Mitsubishi Chemical Corp.)

(2) Maximum Quantity of Outgas (Released Gas)

Test pieces were left to stand for a further 1 hour in a room at 25° C. and 50% in humidity. After that, they were degassed by heating and evacuating using a high vacuum outgas analyzer and quantities of released gases from the test pieces were determined. Concerning Sample 2 and Sample A, the relationship between the durations and pressures, and the durations and temperatures are shown in the attached FIG. 1.

FIG. 1 and the method for experiments will be described in more detail.

The test pieces used in the evaluation were those which were prepared as described above by applying coating compositions to glass plates and leaving them to stand in the air. If the adsorbing property was large, moisture and carbon dioxide were adsorbed. The test pieces were put into the gas analyzer and roughly evacuated with a pressure reducing device to confirm that the degree of vacuum in the sample chamber is sufficient. After that, test pieces were heated to 410° C. at a rate of 10° C./min and evacuation was carried out to a high vacuum level of $1\times10^{-3}$ Torr. In this procedure, the degree of vacuum is gradually raised in the rough evacuation, however, when the heating of test pieces were started, the releasing of adsorbed substance from the coating films began and the degree of vacuum became low. This tendency was especially prominent when the temperature exceeded 100° C., which was due to the evaporation of water content in the coating films. However, owing to the continuous evacuation of the sample chamber, minimum values in the degree of vacuum, i.e., maximum values in pressure were observed in the region between 100° to 150° C. as shown in FIG. 1. In the present invention, the maximum values in pressures were evaluated as maximum outgas quantities during the gas releasing.

In Sample 2 in FIG. 1, the maximum pressure in gas releasing as represented with a solid line was $5.0\times10^{-3}$ Torr and that of Sample A (comparative example) as represented with a chain line was $2.0\times10^{-2}$.

These values indicate the conditions of the gas adsorption of coating films and it was understood that the lower the maximum pressure, the smaller the quantity of gas adsorption.

(3) Adhesive Property

In the test on adhesive property of coating films, a pressure sensitive tape was stuck to the surface of coating film and the tape was then peeled off to observe the state of coating film after the peeling. This tape peeling test was done in accordance with JIS K 5631 (Oil paint for shell plates of steel ships). In test results, the denominator is the total number of cross-cuts in peeling tests and the numerator is the number of the cross-cuts which are not peeled off. That is, "10/100" means that 90 cross-cuts were peeled off out of 100 and 10 cross-cuts remained.

The results on the samples in Table 1 are shown in the following Table 2.

TABLE 2

| | Characteristics of Samples | | | | | | |
|---|---|---|---|---|---|---|---|
| Sample No. | 1 | 2 | 3 | 4 | 5 | A | B |
| Specific Resistance (Ω · cm) | 0.03 | 0.03 | 0.31 | 0.32 | 0.40 | 0.03 | 0.03 |
| Maximum Pressure in Degassing at 100–150° C. ($\times 10^{-3}$ Torr) | 5.1 | 5.0 | 5.2 | 5.1 | 5.0 | 20.0 | 4.8 |
| Adhesiveness | 100/100 | 100/100 | 100/100 | 100/100 | 100/100 | 100/100 | 10/100 |

It was understood that, as compared with Sample A containing potassium silicate having a molar ratio of 3.5, Samples 1 to 5 containing potassium silicate having a molar ratio of 4 to 5 according to the present invention were desirable in values of specific resistances, low in maximum pressures in degassing and excellent in adhesiveness. Furthermore, in Sample B containing potassium silicate having a molar ratio of 5.3, although it was comparable to the samples of the present invention in view of the specific resistance and the maximum pressure in degassing, the adhesiveness was not good.

EXAMPLE 2

Preparation of Potassium Silicate Adhesive

The potassium silicate (500 g) having a molar ratio of 5.3 (solid content: 26.8%) which was prepared in the foregoing Example 1 was fed into a 1 liter beaker. With stirring at 40° C. and 120 r.p.m. in the like manner as in Example 1, 264 g of an aqueous solution of potassium silicate having a molar ratio of 3.5 (solid content: 30.0%) was slowly poured into the above solution. After all the latter silicate solution was fed, the stirring was continued for further 60 minutes, thereby preparing an aqueous solution of potassium silicate having a molar ratio of 4.5 (solid content: 27.9), which was designated as Potassium Silicate No. 1.

In the like manner as the above, 5.9 g of solid potassium hydroxide was added to 500 g of an aqueous solution of potassium silicate having a molar ratio of 5.3 and dissolved together to prepare an aqueous solution of potassium silicate having a molar ratio of 4.5 (solid content: 29.4%). This was designated as Potassium Silicate No. 2.

Preparation of Coating Composition

As shown in the following Table 3, coating compositions (Samples 6 and 7) were prepared in the like manner as Sample 2 in Example 1 using the above Potassium Silicate Nos. 1 and 2 of 4.5 in molar ratio.

TABLE 3

| | Coating Composition (g) | |
|---|---|---|
| Sample No. | 6 | 7 |
| Graphite | 195 | 195 |
| Potassium Silicate ($SiO_2/K_2O$ = 4.5) No. 1 | 345 | — |
| Potassium Silicate ($SiO_2/K_2O$ = 4.5) No. 2 | — | 336 |
| Dispersing Agent CMC | 6 | 6 |
| Pure Water | 640 | 658 |

Preparation and Evaluation of Test Pieces

Test pieces were prepared in the like manner as in Example 1 and specific resistances of coating films, maximum pressures in degassing and adhesiveness of coating films were measured. The results of them are shown in the following Table 4.

TABLE 4

| | Characteristics of Samples | |
|---|---|---|
| Sample No. | 6 | 7 |
| Specific Resistance (Ω · cm) | 0.03 | 0.03 |
| Maximum Pressure in Degassing at 100–150° C. (× $10^{-3}$ Torr) | 5.1 | 5.2 |
| Adhesiveness | 100/100 | 100/100 |

These results were equivalent to the results in Sample 2 as shown in Table 2. It was, therefore, understood that if the molar ratios of potassium silicate are the same, the obtained coating film can exhibit equivalent characteristics even when the processes for preparing the silicate solutions are different.

As described above, because the outgas quantity in evacuation under heating is small in the cathode-ray tubes which are prepared by using the coating composition of the present invention, it is possible to reduce the time period of degassing in the production process. In addition, even when the temperature of the evacuation is lowered, the obtained quality thereof can be equal at least to those of the conventional ones.

What is claimed is:

1. A coating composition for the inner wall of a cathode-ray tube which comprises an aqueous dispersion medium consisting essentially of potassium silicate, a dispersing agent and graphite particles, or a combination of graphite particles and metal oxide particles or metal carbide particles suspended therein, wherein the molar ratio of silicon dioxide to potassium oxide ($SiO_2/K_2O$) in said potassium silicate is in the range of from 4 to 5.

2. The coating composition as claimed in claim 1, wherein said potassium silicate having a molar ratio of ($SiO_2/K_2O$) in the range of from 4 to 5 is prepared by dissolving together potassium silicate having a molar ratio of less than 4 and another potassium silicate having a higher molar ratio.

3. The coating composition as claimed in claim 1, wherein said potassium silicate having a molar ratio of ($SiO_2/K_2O$) in the range of from 4 to 5 is prepared by dissolving fine particles of silicic anhydride into an aqueous solution of potassium silicate having a molar ratio of less than 4.

4. The coating composition as claimed in claim 1, wherein said potassium silicate having a molar ratio of ($SiO_2/K_2O$) in the range of from 4 to 5 is prepared by adding potassium silicate to an aqueous solution of water soluble silica and potassium hydroxide.

5. The coating composition as claimed in any one of claims 1 to 4, wherein said composition consisting essentially of:

graphite particles: 50–80 wt. %,
potassium silicate: 20–50 wt. %, and
dispersing agent: 1–3 wt. %.

6. The coating composition as claimed in any one of claims 1 to 4, wherein said composition consisting essentially of:

graphite particles: 60–70 wt. %,
potassium silicate: 30–40 wt. %, and
dispersing agent: ca. 2 wt. %.

7. The coating composition as claimed in any one of claims 1 to 4, wherein said composition consisting essentially of:

graphite particles: 15–50 wt. %,
potassium silicate: 20–50 wt. %,
metallic compound(s) of iron oxide, titanium oxide, silicon carbide or mixtures thereof: 10–50 wt. %, and
dispersing agent: 1–3 wt. %.

8. The coating composition as claimed in any one of claims 1 to 4, wherein said composition consisting essentially of:

graphite particles: 30–40 wt. %,
potassium silicate: 30–40 wt. %,
metallic compound(s) 20–35 wt. %, and
dispersing agent: ca. 2 wt. %.

* * * * *